United States Patent
Chen (10) Patent No.: US 10,839,581 B2
(45) Date of Patent: Nov. 17, 2020

(54) COMPUTER-IMPLEMENTED METHOD FOR GENERATING COMPOSITE IMAGE, APPARATUS FOR GENERATING COMPOSITE IMAGE, AND COMPUTER-PROGRAM PRODUCT

(71) Applicant: BOE Technology Group Co., Ltd., Beijing (CN)

(72) Inventor: Guannan Chen, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/464,242

(22) PCT Filed: Oct. 25, 2018

(86) PCT No.: PCT/CN2018/111878
§ 371 (c)(1),
(2) Date: May 24, 2019

(87) PCT Pub. No.: WO2020/000814
PCT Pub. Date: Jan. 2, 2020

(65) Prior Publication Data
US 2020/0286273 A1    Sep. 10, 2020

(30) Foreign Application Priority Data

Jun. 29, 2018 (CN) .......................... 2018 1 0697069

(51) Int. Cl.
*G06T 11/60*  (2006.01)
*G06T 5/50*   (2006.01)
(Continued)

(52) U.S. Cl.
CPC .......... *G06T 11/60* (2013.01); *G06K 9/00281* (2013.01); *G06N 3/08* (2013.01);
(Continued)

(58) Field of Classification Search
CPC ....... G06T 11/60; G06T 5/50; G06K 9/00281; G06N 3/08
See application file for complete search history.

(56) References Cited

U.S. PATENT DOCUMENTS 9,710,697 B2 *  7/2017  Tang .................. G06K 9/00228
10,621,779 B1 *  4/2020  Topiwala ................. G06T 7/50
(Continued)

FOREIGN PATENT DOCUMENTS

CN          107506800 A       12/2017

OTHER PUBLICATIONS

Li, Yanghao, et al. "Demystifying neural style transfer." arXiv preprint arXiv:1701.01036 (2017) (pp. 1-7).*
(Continued)

*Primary Examiner* — Sarah Lhymn
(74) *Attorney, Agent, or Firm* — Intellectual Valley Law, P.C.

(57) ABSTRACT

A computer-implemented method for generating a composite image. The method includes iteratively optimizing an intermediate style transfer image using an initial style transfer image as a starting point based on a predefined loss function, original content features of a first input image, and original style features of a second input image; generating an optimized style transfer image after iteratively optimizing is performed for N times, N>1; and morphing the optimized style transfer image with the second input image to generate the composite image.

20 Claims, 5 Drawing Sheets

(51) Int. Cl.
G06N 3/08 (2006.01)
G06K 9/00 (2006.01)

(52) U.S. Cl.
CPC ...... G06T 5/50 (2013.01); *G06T 2207/20081* (2013.01); *G06T 2207/20221* (2013.01)

(56) References Cited

U.S. PATENT DOCUMENTS

| | | | |
|---|---|---|---|
| 10,664,722 B1* | 5/2020 | Sharma | G06K 9/6256 |
| 2009/0309894 A1 | 12/2009 | Lam et al. | |
| 2011/0292075 A1 | 12/2011 | Sukenori | |
| 2016/0110900 A1 | 4/2016 | Moosa et al. | |
| 2016/0174902 A1* | 6/2016 | Georgescu | A61B 5/7267 600/408 |
| 2017/0344808 A1* | 11/2017 | El-Khamy | G06K 9/00228 |
| 2018/0158240 A1* | 6/2018 | Saito | G06T 15/04 |
| 2018/0357800 A1* | 12/2018 | Oxholm | G06N 3/084 |
| 2018/0374242 A1* | 12/2018 | Li | G06T 15/04 |
| 2019/0130575 A1* | 5/2019 | Chen | G06N 3/084 |
| 2019/0171908 A1* | 6/2019 | Salavon | G06F 16/55 |
| 2019/0172224 A1* | 6/2019 | Vajda | G06N 3/0454 |
| 2019/0251401 A1* | 8/2019 | Shechtman | G06K 9/66 |
| 2019/0347522 A1* | 11/2019 | Nir | G06K 9/6256 |
| 2019/0347526 A1* | 11/2019 | Sunkavalli | G06K 9/4661 |
| 2019/0354802 A1* | 11/2019 | Lin | G06K 9/52 |
| 2020/0082198 A1* | 3/2020 | Yao | G06N 3/0454 |
| 2020/0151849 A1* | 5/2020 | Liao | G06T 3/0012 |

OTHER PUBLICATIONS

Gatys, Leon A., Alexander S. Ecker, and Matthias Bethge. "A neural algorithm of artistic style." arXiv preprint arXiv:1508.06576 (2015) (pp. 1-16).*
Gatys, L. A., Ecker, A. S., & Bethge, M. (2016). Image style transfer using convolutional neural networks. In Proceedings of the IEEE conference on computer vision and pattern recognition (pp. 2414-2423).*
International Search Report & Written Opinion dated Apr. 1, 2019, regarding PCT/CN2018/111878.
Fast Face-swap Using Convolutional Neural Networks, Iryna Korshunova et al., arXiv: 1611.09577v2 [cs.CV] Jun. 27, 2017.
A Neural Algorithm of Artistic Style, Leon A. Gatys et al., arXiv:1508.06576v2 [cs.CV] Sep. 2, 2015.
Stochastic gradient descent, from Wikipedia, https://en.wikipedia.org/wiki/Stochastic_gradient_descent.

* cited by examiner

COMPUTER-IMPLEMENTED METHOD FOR GENERATING COMPOSITE IMAGE, APPARATUS FOR GENERATING COMPOSITE IMAGE, AND COMPUTER-PROGRAM PRODUCT

CROSS-REFERENCE TO RELATED APPLICATION

This application is a national stage application under 35 U.S.C. § 371 of International Application No. PCT/CN2018/111878, filed Oct. 25, 2018, which claims priority to Chinese Patent Application No. 201810697069.2, filed Jun. 29, 2018, the contents of which are incorporated by reference in the entirety.

TECHNICAL FIELD

The present invention relates to display technology, more particularly, to a computer-implemented method for generating a composite image, an apparatus for generating a composite image, and a computer-program product.

BACKGROUND

The facial feature recognition technology gains worldwide attention nowadays, especially in security area and entertainment area. The facial feature recognition technology is also used to morph faces in images.

SUMMARY

In one aspect, the present invention provides a computer-implemented method for generating a composite image, comprising iteratively optimizing an intermediate style transfer image using an initial style transfer image as a starting point based on a predefined loss function, original content features of a first input image, and original style features of a second input image; generating an optimized style transfer image after iteratively optimizing is performed for N times, N>1; and morphing the optimized style transfer image with the second input image to generate the composite image.

Optionally, the computer-implemented method further comprises extracting a content feature map from the first input image by a computer system; extracting a style feature map from the second input image by the computer system; generating the original style features from the style feature map; and generating the original content features from the content feature map.

Optionally, the original style features are generated from the style feature map using a deep convolutional neural network; and the original content features are generated from the content feature map using the deep convolutional neural network.

Optionally, the original content features are generated from a higher convolutional layer of the deep convolutional neural network than that for the original style features.

Optionally, the predefined loss function comprises a content loss function for calculating content loss and a style loss function for calculating style loss; and each of the content loss function and the style loss function is used in iteratively optimizing the intermediate style transfer image.

Optionally, the computer-implemented method further comprises calculating a weighted sum of a content loss and a style loss as a total loss; and generating the optimized style transfer image when the total loss is lower than a threshold value.

Optionally, iteratively optimizing the intermediate style transfer image comprises generating content features and style features from an n-th intermediate style transfer image using a deep convolutional neural network, N−1≥n≥i; calculating an n-th content loss of the n-th intermediate style transfer image relative to the original content features and an n-th style loss of the n-th intermediate style transfer image relative to the original style features based on the predefined loss function; calculating a weighted sum of the n-th content loss and the n-th style loss as an n-th total loss; and optimizing the n-th intermediate style transfer image to generate an (n+1) intermediate style transfer image based on the n-th total loss.

Optionally, the content loss function is defined as $$L_{content} = \frac{1}{2C1}\sum_{ij}(F_{ij}^l - P_{ij}^l)^2;$$

and wherein C1 is a standardizing constant, $F_{ij}^l$ stands for a value of a j-th pixel of a feature map of an n-th intermediate style transfer image outputted from an i-th convolutional kernel of a l-th convolutional layer of a deep convolutional neural network; $P_{ij}^l$ is a value of a j-th pixel of a feature map of the first input image outputted from the i-th convolutional kernel of the l-th convolutional layer of the deep convolutional neural network.

Optionally, the style loss function is defined as $$L_{style} = \sum_{l=0}^{L} w_l E_l; \text{ wherein } E_l = \frac{1}{4N_l^2 M_l^2 C2}\sum_{i,j}(G_{ij}^l - A_{ij}^l)^2;$$

and wherein C2 is a standardizing constant, $G_{ij}^l$ is a Gram matrix of an n-th intermediate style transfer image outputted from a l-th convolutional layer of a deep convolutional neural network, $A_{ij}^l$ stands for a Gram matrix of the second input image outputted from the l-th convolutional layer of the deep convolutional neural network, $N_l$ stands for a total number of convolutional kernels in the l-th convolutional layer of the deep convolutional neural network respectively outputting a total number of $N_l$ feature maps, and $M_l$ stands for an area of each of the $N_l$ feature maps, and $w_l$ stands for a weight of a style loss of the l-th convolutional layer of the deep convolutional neural network with respect to a total style loss.

Optionally, prior to morphing the optimized style transfer image with the second input image, the computer-implemented method further comprises performing an image alignment between the optimized style transfer image and the second input image.

Optionally, morphing the optimized style transfer image with the second input image comprises morphing a target region in a calibrated optimized style transfer image with a corresponding region in the second input image using a morphed mask as a guide.

Optionally, the computer-implemented method further comprises performing Gaussian blur on the optimized style transfer image to obtain a blurred optimized style transfer image; performing Gaussian blur on the second input image to obtain a blurred second input image; calculating a luminance scale coefficient for each pixel by calculating a ratio of luminance values between the blurred optimized style transfer image and the blurred second input image for each pixel; and performing a luminance value calibration on the optimized style transfer image based on the luminance scale coefficient of each pixel to obtain the calibrated optimized style transfer image.

Optionally, the computer-implemented method further comprises calculating a first two-dimensional convex hull boundary based on feature point vector of the optimized style transfer image; calculating a second two-dimensional convex hull boundary based on feature point vector of the second input image; assigning a region in the first two-dimensional convex hull boundary as a first mask; assigning a region in the second two-dimensional convex hull boundary as a second mask; and assigning a union of the first mask and the second mask as the morphed mask.

Optionally, a total number of convolutional layers of the deep convolutional neural network is 8.

Optionally, the original content features is generated from a seventh convolutional layer of the deep convolutional neural network; and the original style features is generated from a first convolutional layer, a third convolutional layer, and a fifth convolutional layer of the deep convolutional neural network.

Optionally, the deep convolutional neural network uses pre-training parameters of a VGG19 model as initial pre-training parameters.

Optionally, the first input image comprises a first facial image; the second input image comprises a second facial image; the original content features of the first input image comprise original facial content features of the first facial image; the original style features of the second input image comprise original facial style features of the second facial image; the optimized style transfer image comprises an optimized facial style transfer image; and morphing the optimized style transfer image with the second input image comprises morphing the optimized facial style transfer image with the second facial image.

Optionally, a white noise image is selected as the initial style transfer image.

In one aspect, the present invention provides an apparatus for generating a composite image, comprising a memory; one or more processors; wherein the memory and the one or more processors are connected with each other; and the memory stores computer-executable instructions for controlling the one or more processors to iteratively optimize an intermediate style transfer image using an initial style transfer image as a starting point based on a predefined loss function, original content features of a first input image, and original style features of a second input image; generate an optimized style transfer image after iteratively optimizing is performed for N times, N>1; and morph the optimized style transfer image with the second input image to generate the composite image.

In one aspect, the present invention provides a computer-program product comprising a non-transitory tangible computer-readable medium having computer-readable instructions thereon, the computer-readable instructions being executable by a processor to cause the processor to perform iteratively optimizing an intermediate style transfer image using an initial style transfer image as a starting point based on a predefined loss function, original content features of a first input image, and original style features of a second input image; generating an optimized style transfer image after iteratively optimizing is performed for N times, N>1; and morphing the optimized style transfer image with the second input image to generate a composite image.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

The present disclosure provides, inter alia, a computer-implemented method for generating a composite image, an apparatus for generating a composite image, and a computer-program product that substantially obviate one or more of the problems due to limitations and disadvantages of the related art. In one aspect, the present disclosure provides a computer-implemented method for generating a composite image. In some embodiments, the method includes iteratively optimizing an intermediate style transfer image using an initial style transfer image as a starting point based on a predefined loss function, original content features of a first input image, and original style features of a second input image; generating an optimized style transfer image after iteratively optimizing is performed for N times, N>1; and morphing the optimized style transfer image with the second input image to generate the composite image. The present method generates a composite image using an iteratively optimizing process and optionally using a deep convolutional neural network, obviating extensive self-iterative training and complicated structure of a convolutional neural network.

As used herein, the term "style feature" refers to a feature that provides information about a style of the image.

As used herein, the term "content feature" refers to a feature that provides information about content of the image.

As used herein, the term "morphing" in the context of the present disclosure broadly refers to combining two or more images together to produce a composite image. Optionally, in a morphing process, elements of a start image are faded and distorted into those of an end image (the composite image), thereby dissolving one image into another.

The present disclosure is used to generating a composite image, especially used to morphing images between a photo and a portrait. Optionally, the photo includes a facial image. Optionally, the photo includes a monotonous background (e.g. a monochrome background). Optionally, the photo includes a complicated background (e.g. a background with landscape). Optionally, a portrait is a portrait painting having styles in various eras (e.g. The Renaissance) or having styles in various artistic genres. Optionally, the portrait painting may be avatars, busts, or full-length portraits. For example, the portrait painting may be a work of famous painters with strong personal styles, such as a work of Van Gogh, a work of Leonardo da Vinci. There are strong style differences between a photo and a portrait painting, it is necessary to have a method to morph a facial image in a photo to a portrait painting having a different style, as well as morph the style of the portrait painting into the facial image of the photo.

In some embodiments, the computer-implemented method for generating a composite image may be used with one or a combination of a software, a hardware and a firmware. In some embodiments, the computer-implemented method for generating a composite image may be used to process photos and portrait painting. Optionally, the computer-implemented method for generating a composite image may be used to process facial images.

Figure 1:
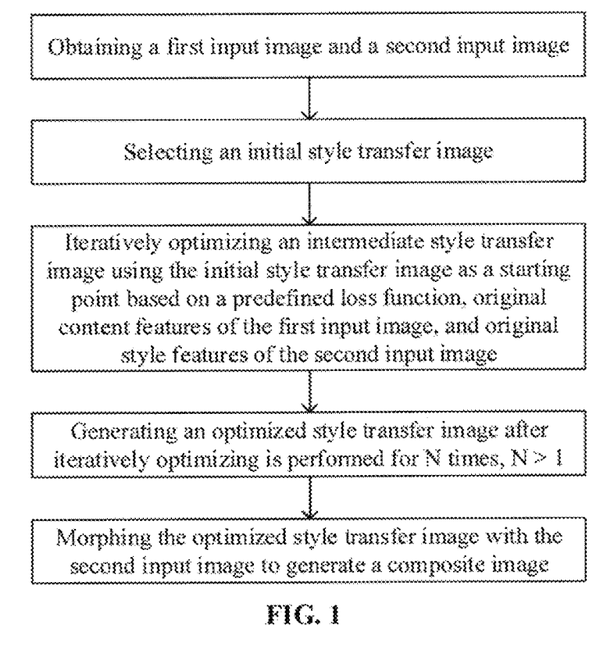
FIG. 1 is a flow chat illustrating a computer-implemented method for generating a composite image in some embodiments according to the present disclosure.

FIG. 1 is a flow chat illustrating a computer-implemented method for generating a composite image in some embodiments according to the present disclosure. Referring to FIG. 1, a computer-implemented method for generating a composite image includes obtaining a first input image and a second input image; selecting an initial style transfer image; iteratively optimizing an intermediate style transfer image using the initial style transfer image as a starting point based on a predefined loss function, original content features of the first input image, and original style features of the second input image; generating an optimized style transfer image after iteratively optimizing is performed for N times, N>1; and morphing the optimized style transfer image with the second input image to generate a composite image.

In some embodiments, obtaining the first input image and the second input image includes extracting a content feature map of the first input image by a computer system and extracting a style feature map of the second input image by a computer system. Optionally, the first input image includes a first facial image, and the second input image includes a second facial image. Optionally, the first input image is a photo including a facial image. In one example, the first input image is a real-time photo taken by a camera. In another example, the first input image is a photo selected from local albums. For example, the user can be informed to take a photo including a facial image. Optionally, the second input image is a portrait painting. In one example, the second input image can be selected from locally stored portrait painting. In another example, the second input image can be an image of a portrait painting captured by a camera. In another example, the second input image can be downloaded from internet based on the keyword search on internet. Optionally, when the second input image is determined before the first input image, the user may be informed to take a photo of a person in a shooting angle same as the one of the second input image. The first input image and the second input image have a same shooting angle, making the morphing effect better.

In some embodiments, obtaining the first input image and the second input image includes analyzing the first input image and the second input image. Optionally, the location of a facial image occupies in an image may be determined by detecting and determining facial features. In one example, a boundary of a facial image is determined by feature points showing a facial contour, and the image within the boundary can be extracted as the facial image. In another example, the boundary of a facial image is defined as a largest circumscribed rectangle of a facial contour.

In some embodiments, iteratively optimizing an intermediate style transfer image using the initial style transfer image as a starting point based on a predefined loss function, original content features of the first input image, and original style features of the second input image includes generating an original content features of the first input image from the content feature map of the first input image using a deep convolutional neural network, and generating an original style features of the second input image from the style feature map of the first input image using the deep convolutional neural network. Optionally, the original content features are generated from a higher convolutional layer of the deep convolutional neural network than a convolutional layer generating the original style features. Optionally, the original content features of the first input image and the original style features of the second input image can be sequentially generated by the deep convolutional neural network. Optionally, the original content features of the first input image and the original style features of the second input image can be generated at the same time by the deep convolutional neural network. Optionally, the original content features of the first input image and the original style features of the second input image can be stored in a memory to be used in the iteratively optimizing process.

In some embodiments, the initial style transfer image is a white noise image. In some embodiments, iteratively optimizing an intermediate style transfer image using the initial style transfer image as a starting point based on a predefined loss function, original content features of the first input image, and original style features of the second input image further includes inputting the initial style transfer image in the deep convolutional neural network; obtaining content features and style features of the initial style transfer image; and calculating a content loss of the initial style transfer image relatively to the original content features and a style loss of the initial style transfer image relatively to the original style features based on the predefined loss function. Optionally, iteratively optimizing an intermediate style transfer image using the initial style transfer image as a starting point based on a predefined loss function, original content features of the first input image, and original style features of the second input image further includes calculating a sum loss of the content loss of the initial style transfer image relatively to the original content features and a sum loss of the style loss of the initial style transfer image relatively to the original style features. Optionally, the content loss of the initial style transfer image relatively to the original content features and the style loss of the initial style transfer image relatively to the original style features is used to optimize the initial style transfer image to generate an intermediate style transfer image. For example, optimizing the initial style transfer image includes modifying the initial style transfer image. Optionally, the intermediate style transfer image is inputted into the deep convolutional neutral network to perform an iteratively optimizing process and an iteratively loss calculation process. In some embodiments, subsequent to iteratively optimizing the intermediate style transfer image, an optimized style transfer image is generated after iteratively optimizing is performed for N times, N>1. In one example, N times is in a range of 90 times to 110 times, e.g., 90 times to 95 times, 95 times to 100 times, 100 times, to 105 times, 105 times to 110 times. For example, N times can be 100 times. In some embodiments, iteratively optimizing the intermediate style transfer image includes generating content features and style features from an n-th intermediate style transfer image using the deep convolutional neural network, $N-1 \geq n \geq 1$; calculating an n-th content loss of the n-th intermediate style transfer image relative to the original content features and an n-th style loss of the n-th intermediate style transfer image relative to the original style features based in the predefined loss function; calculating a weighted sum of the n-th content loss and the n-th style loss as an n-th total loss; and optimizing the n-th intermediate style transfer image to generate an (n+1) intermediate style transfer image based on the n-th total loss. In some embodiments, the times of the iteratively optimizing process performed is limited in a relatively small number, the time spent in optimizing an image is greatly reduced.

In some embodiments, prior to morphing the optimized style transfer image with the second input image to generate a composite image, an image alignment is performed between the optimized style transfer image and the second input image. Optionally, the image alignment includes performing one or a combination of rotating, scaling, and panning the optimized style transfer image with respect to the second input image. Optionally, subsequent to obtaining the first input image and the second input image, the image alignment is performed between the first input image and the second input image. Optionally, prior to morphing the optimized style transfer image with the second input image, the location occupied by a facial image in the optimized style transfer image corresponds to a location occupied by a facial image in the second input image, the result of morphing is more natural, and the user experience is better.

In some embodiments, morphing the optimized style transfer image with the second input image includes calculating a first two-dimensional convex hull boundary based on feature point vector of the optimized style transfer image; calculating a second two-dimensional convex hull boundary based on feature point vector of the second input image; assigning a region in the first two-dimensional convex hull boundary as a first mask; assigning a region in the second two-dimensional convex hull boundary as a second mask; assigning a union of the first mask and the second mask as a morphed mask; performing Gaussian blur on the optimized style transfer image to obtain a blurred optimized style transfer image; performing Gaussian blur on the second input image to obtain a blurred second input image; calculating a luminance scale coefficient for each pixel by calculating a ratio of luminance values between the blurred optimized style transfer image and the blurred second input image for each pixel; performing a luminance value calibration on the optimized style transfer image based on the luminance scale coefficient of each pixel to obtain a calibrated optimized style transfer image; and morphing a target region in the calibrated optimized style transfer image with a corresponding region in the second input image using the morphed mask as a guide. Optionally, the image alignment includes performing one or a combination of rotating, scaling, or panning the target region in the calibrated optimized style transfer image with respect to the corresponding region in the second input image.

Figure 2:
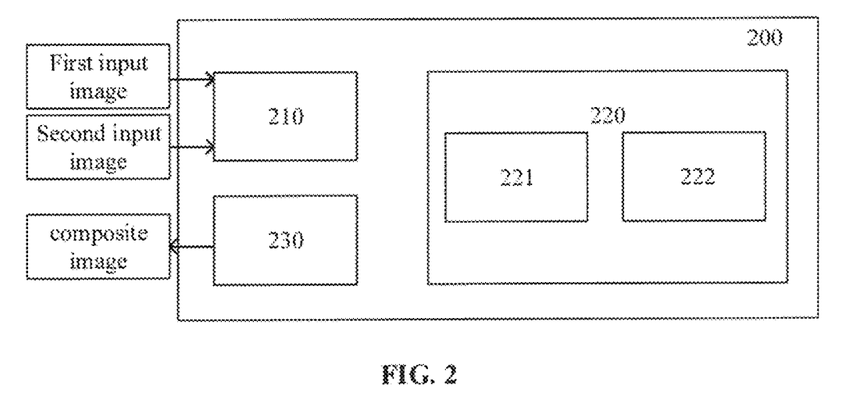
FIG. 2 is a schematic diagram illustrating an apparatus using a computer-implemented method for generating a composite image in some embodiments according to the present disclosure.

In another aspect, the present disclosure also provides an apparatus using a computer-implemented method for generating a composite image. FIG. 2 is a schematic diagram illustrating an apparatus using a computer-implemented method for generating a composite image in some embodiments according to the present disclosure. Referring to FIG. 2, in some embodiments, an apparatus 200 using a computer-implemented method for generating a composite image is relevant to computer, and is configured to be a computing device or a party of a computing device. Various appropriate devices may be used as a computing device. Examples of devices suitable for being used as a computing device includes, but not limited to, mobile devices, personal digital assistants, mobile computing devices, smart phones, computers, personal computers (PCs), desktop computers, laptop computers.

In some embodiments, the apparatus 200 include an image extractor 210, a style migrator 220, and a composite image generator 230. In some embodiments, the image extractor 210 is configured to extract a content feature map from the first input image by a computer system, and to extract a style feature map from the second input image by the computer system. Optionally, the image extractor 210 is configured to extract facial images from the first input image and the second input image. In one example, the user may morph the facial image of a photo with a portrait painting, for example, replacing a facial image of the portrait painting with the facial image of the photo. Optionally, the photo is a real-time photo taken by a camera. Optionally, the photo can be read from photo stored in a memory. Optionally, the photo can be downloaded from internet. Optionally, the portrait painting is selected from portrait paintings stored in a memory. Optionally, the portrait painting can be downloaded from internet. Optionally, the portrait painting can be inputted by a device such as a camera or a scanner.

In some embodiments, the image extractor 210 extracts a facial image based on facial features in a photo. Optionally, the image extractor 210 can analyze facial features of the photo. Optionally, a facial feature recognition library dlib is adopted by the image extractor 210 to extract facial features. For example, the facial feature recognition library dlib is formed by marking feature points in an image (e.g. facial feature points of eyebrows, facial feature points of eyes, facial feature points of a nose, facial feature points of lips, or facial feature points of a mouth.); using a method of machine learning to train a neural network to obtain trained models, and integrally packaging the trained models to form the facial feature recognition library.

Figure 3:
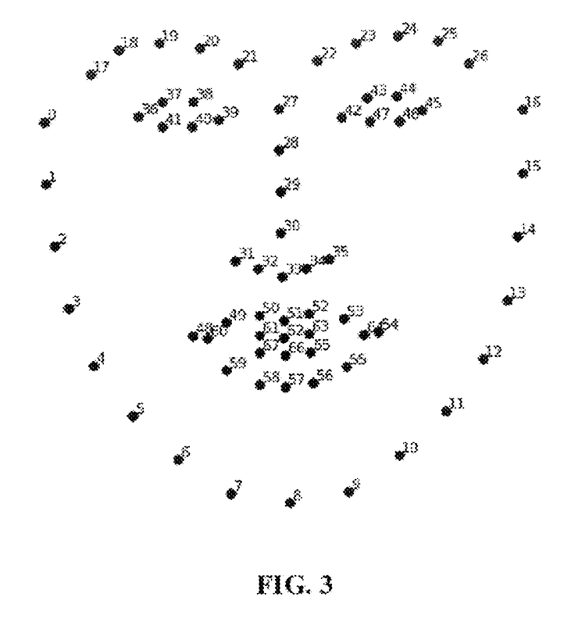
FIG. 3 is a schematic diagram showing feature points in some embodiments according to the present disclosure.

FIG. 3 is a schematic diagram showing feature points in some embodiments according to the present disclosure. FIG. 3 shows 68 facial feature points extractable using the facial feature recognition library dlib. Referring to FIG. 3, facial feature points No. 0 to No. 26 depict a contour of a face, facial feature points No. 27 to No. 35 depict a contour of a nose, facial feature points No. 36 to No. 41 depict a contour of an eye, facial feature points No. 42 to No. 47 depict a contour of an eye, and facial feature points No 48 to No. 68 depict a contour of lips. In some embodiments, based on the facial feature points forming a plurality of facial contours (e.g. a contour of a face, a contour of a nose, a contour of an eye, and a contour of lips), the image extractor 210 can generate a plurality of facial boundary boxes respectively corresponding to a plurality of facial contours. For example, the facial feature points No. 0 to No. 26 depict the contour of the face. Based on the facial feature points No. 0 to No. 26, the image extractor 210 can generate a facial boundary box for the face. And the image within the facial boundary box is extracted as a facial image. In some embodiment, using the above method of extracting a facial image, a facial image of the portrait painting is extracted from the portrait painting by the image extractor 210.

In some embodiments, the style migrator 220 is configured to perform style transfer on the facial images extracted from the photo and the portrait painting. Optionally, the style migrator 220 includes a deep convolutional neural network 221 and an iterative optimizer 222. In some embodiments, the deep convolutional neural network 221 is configured to generate the original style features from the style feature map using a deep convolutional neural network, and to generate the original content features from the content feature map using the deep convolutional neural network. Optionally, the deep convolutional neural network 221 is configured to obtain content features of the photo and style features of the portrait painting. In one example, the deep convolutional neural network 221 can assign the facial image of the photo as the content feature map of the first input image to obtain the original content features of the first input image, optionally, the original content features of the first input image represent contents of the facial image of the photo. In another example, the deep convolutional neural network 221 can assign the facial image of the portrait painting as the style feature map of the second input image to obtain the original style features of the second input image, optionally, the original style features of the second input image represent styles of the facial image of the portrait painting. Optionally, the original content features and the original style features can be generated from different layers of the deep convolutional neural network 221. Optionally, the original content features are generated from a higher convolutional layer of the deep convolutional neural network 221 than that for the original style features.

In some embodiments, the iterative optimizer 222 is configured to iteratively optimize an intermediate style transfer image using the initial style transfer image as a starting point based on the predefined loss function, original content features of the first input image, and original style features of the second input image; and generating the optimized style transfer image after iteratively optimizing is performed for N times, N>1. Optionally, the predefined loss function includes a content loss function for calculating content loss based on the original content features and a style loss function for calculating style loss based on the original style features. Optionally, the iterative optimizer 222 uses the content loss function and the style loss function separately in iteratively optimizing the intermediate style transfer image. Optionally, the iterative optimizer 222 is configured to generate the optimized style transfer image after iteratively optimizing is performed for N times, N>1.

In some embodiments, the composite image generator 230 is configured to morphing the optimized style transfer image with the second input image (e.g. the portrait painting) to generate a composite image (e.g. a composite image having a style migrated facial image of the photo). Optionally, the composite image generator 230 can perform the image alignment between the optimized style transfer image and the second input image prior to morphing the optimized style transfer image with the second input image. In some embodiments, after obtaining feature points of the optimized style transfer image and feature points of the second input image (e.g. the portrait painting), the composite image generator 230 can use the second input image (e.g. the portrait painting) as a guide, and analyze types of processes to be apply to the optimized style transfer image to perform the image alignment. Optionally, the types of processes to be apply to the optimized style transfer image to perform image alignment includes performing one or a combination of rotating, scaling, or panning the optimized style transfer image with respect to the second input image (e.g. the portrait painting). Subsequent to the image alignment, the optimized style transfer image is geometrically consistent with the second input image (e.g. the portrait painting).

In some embodiments, referring to FIG. 3, using the 68 facial feature points, the types of processes to be apply to the facial image to perform image alignment can be determined by minimized the following formula:

$$\sum_{i=1}^{68} \|sRp_i^T + T - q\|^2 \quad (1)$$

wherein, s is a scalar representing a geometric scaling; R is a 2×2 matrix representing a geometric rotation; T is a two-dimensional vector representing a geometric panning; $p_i$ is a feature point vector of the optimized style transfer image; $q_i$ is a feature point vector of the second input image (e.g. the portrait painting).

The formula (1) can be calculated by Procrustes analysis to obtain an affine transformation matrix. The steps to calculate the formula (1) includes calculating an average value c1 of the feature point vector $p_i$ of the optimized style transfer image, and an average value c2 of the feature point vector $q_i$ of the second input image (e.g. the portrait painting); calculating a standard deviation s1 with respect to the average value c1 and the feature point vector $p_i$ of the optimized style transfer image, and a standard deviation s2 with respect to the average value c2 and the feature point vector $q_i$ of the second input image (e.g. the portrait painting); subtracting the average value c1 from the feature point vector $p_i$ of the optimized style transfer image, and dividing the result of subtraction thereof with the standard deviation s1; subtracting the average value c2 from the feature point vector $q_i$ of the second input image (e.g. the portrait painting), and dividing the result of subtraction thereof with the standard deviation s2.

The R matrix is obtained by singular value decomposition as follows:

$$U,S,V=SVD(p^T \cdot q) \quad (2)$$

$$R=(U*V)T \quad (3)$$

an affine matrix M is obtained:

$$M = \begin{bmatrix} D_{11} & D_{12} & E_{11} \\ D_{21} & D_{22} & E_{23} \\ 0 & 0 & 1 \end{bmatrix} \quad (4)$$

wherein $D=(s2/s1)*R$, $E=c2^T-(s2/s1)*R*c1^T$.

An affine transformation is performed on the optimized style transfer image based on the affine matrix M to perform the image alignment between the optimized style transfer image and the second input image (e.g. the portrait painting).

In some embodiments, morphing the photo with the portrait painting using the composite image generator 230 includes calculating the first two-dimensional convex hull boundary based on feature point vector of the optimized style transfer image; calculating the second two-dimensional convex hull boundary based on feature point vector of the second input image (e.g. the portrait painting). As used herein, the term "convex hull boundary" refers to a smallest convex polygon enclosing the contour of an object in the image. For example, to form the smallest convex polygon, at least some feature points (but not necessarily all) on the contour of the object are connected to form a polygon which is the smallest convex polygon possibly drawn. The smallest convex polygon is formed so that all the feature points are enclosed in the smallest convex polygon. Optionally, a region of the convex hull boundary is assigned as a mask. In some embodiments, morphing the photo with the portrait painting using the composite image generator 230 further includes assigning a region in the first two-dimensional convex hull boundary as a first mask; assigning a region in the second two-dimensional convex hull boundary as a second mask; and assigning a union of the first mask and the second mask as a morphed mask. In some embodiments, morphing the photo with the portrait painting using the composite image generator 230 further includes performing Gaussian blur on the optimized style transfer image to obtain a blurred optimized style transfer image; performing Gaussian blur on the second input image to obtain a blurred second input image; and calculating a luminance scale coefficient for each pixel by calculating a ratio of luminance values between the blurred optimized style transfer image and the blurred second input image; and performing a luminance value calibration on the optimized style transfer image based on the luminance scale coefficient to obtain a calibrated optimized style transfer image. The brightness of the calibrated optimized style transfer image is similar to the brightness of the second input image. Optionally, the optimized style transfer image and the second input image (e.g. the portrait painting) are in color, different ratios of luminance values between the blurred optimized style transfer image and the blurred second input image are calculated in difference color channels to obtain different respective luminance scale coefficients for each pixel. Optionally, a color calibration on the optimized style transfer image based on the luminance scale coefficients in different colors is performed to obtain a color-calibrated optimized style transfer image. In some embodiments, morphing the photo with the portrait painting using the composite image generator 230 further includes morphing a target region in the calibrated optimized style transfer image with a corresponding region in the second input image using the morphed mask as a guide. Optionally, the optimized style transfer image and the second input image (e.g. the portrait painting) are in color, a target region in the color-calibrated optimized style transfer image is morphed with a corresponding region in the second input image using the morphed mask as a guide to obtain the composite image. Optionally, a Gaussian blur is performed to smooth some parts of the composite image to perfect the process of morphing.

In some embodiments, the apparatus in the disclosure generating a composite image by performing style transfer on a facial image of a photo, allowing the facial image of the photo and the portrait painting to have a consistent style. So that the composite image can be more natural. The style transfer is performed only on the facial image of the photo, the amount of computation of the deep convolutional network is greatly reduced. The time used to generate the composite image is greatly reduced. The user experience is further improved.

Figure 4:
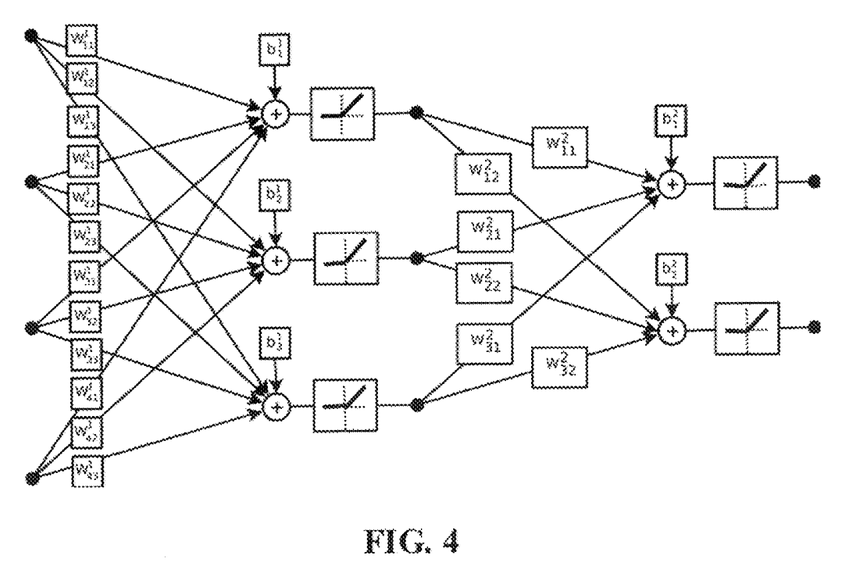
FIG. 4 is a schematic diagram illustrating a structure of a deep convolutional neural network in some embodiments according to the present disclosure.

FIG. 4 is a schematic diagram illustrating a structure of a deep convolutional neural network in some embodiments according to the present disclosure. Referring to FIG. 4, in some embodiments, a deep convolutional neural network includes multiple computational layers. Optionally, images are inputted into each of the multiple computational layers, and images are outputted from each of the multiple computational layers. Optionally, convolution kernels replace scalar weights. In some embodiment, each of the multiple computational layers includes a convolution kernel w of a convolutional layer (e.g. $w_{11}^1, w_{12}^1, w_{13}^1, \ldots, w_{43}^1; w_{11}^2, w_{21}^2, w_{22}^2, \ldots, w_{32}^2$) and a bias $b_i^k$ (e.g. $b_1^1, b_2^1, b_3^1; b_1^2, b_2^2$), wherein k represents an input layer number, i represents an input unit number, j represents an output unit number. The bias $b_i^k$ is a group of scalars superimposed on the output of a convolutional layer. Optionally, the output from a convolutional layer superimposed with bias enters an activation layer. In one example, the activation layer may be RELU. In another example, the activation layer may be sigmoid. Optionally, an activation layer function is generally a nonlinear function. Optionally, the function of the activation layer is to partially suppress parameters of a convolutional layer, and to alleviate over-fitting to some extent.

In some embodiments, the multiple computation layers can process images by feedforward in each layer. In some embodiments, when the deep convolutional neural network is used to process images, each multiple computation layers is considered to be a collection of image filters. Optionally, each image filters extracts one feature from an inputted image. In some embodiments, the character of the deep convolutional neural network is that an inputted image can be converted to information showing the real content of the inputted image other than the pixel values of the inputted image, when the inputted image goes through each convolutional layers of the deep convolutional neural network. Optionally, a feature response of a higher convolutional layer of the deep convolutional neural network can be used to represent contents of the inputted image, e.g. content features of the inputted image. Optionally, in order to obtain information representing styles of the inputted image (e.g. style features), the deep convolutional neural network can capture feature response of a lower convolutional layer used to capture texture information of an inputted image. For example, by combining feature correlations between feature responses from multiple lower convolutional layers, the texture information of the inputted image can be obtained to be the style features of the inputted image.

In some embodiments, a facial image of a photo may be inputted into the deep convolutional network, and content features of the facial image may be obtained from a higher convolutional layer of the deep convolutional neural network. Optionally, a facial image of a portrait painting may be inputted into the deep convolutional network, and style feature of the facial image of the portrait painting may be obtained from one or more lower convolutional layers of the deep convolutional neural network.

Figure 5:
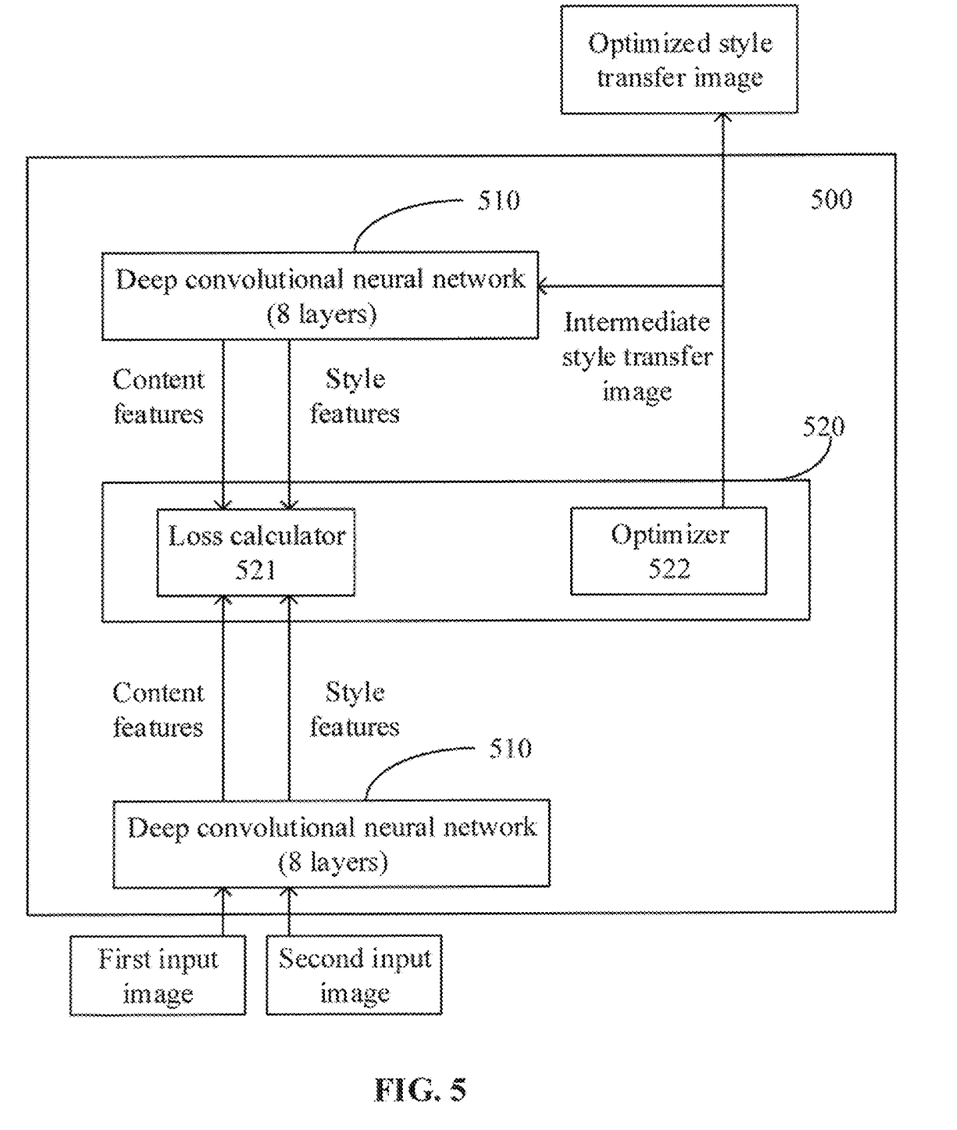
FIG. 5 is a schematic diagram illustrating an image style migrator in some embodiments according to the present disclosure.

FIG. 5 is a schematic diagram illustrating an image style migrator in some embodiments according to the present disclosure. Referring to FIG. 5, in some embodiments, an image style migrator 500 includes a deep convolutional neural network 510 and an iterative optimizer 520. Optionally, a first input image and a second input image are inputted into the deep convolutional neural network 510. Optionally, the deep convolutional neural network 510 processes the first input image and the second input image (e.g. performs filtering process on the first input image and the second input image) to output first content features of the first input image and first style features of the second input image. Optionally, the deep convolutional neural network 510 is configured to output the first content features of the first input image from the $7^{th}$ convolutional layer of the deep convolutional neural network 510. In one example, the first content features of the first input image are the original content features of the first input image. Optionally, the deep convolutional neural network 510 is configured to output the first style features of the second input image from the $1^{st}$, $3^{rd}$, $5^{th}$ convolutional layers of the deep convolution neural network 510. In one example, the first style features of the second input image are the original style features of the second input image. Optionally, the first content features of the first input image and the first style features of the second input image may be represented using feature maps.

In some embodiments, the iterative optimizer 520 is configured to iteratively optimize an intermediate style transfer image using the initial style transfer image as a starting point based on a predefined loss function, original content features (e.g. the first content features) of the first input image and original style features (e.g. the first style features) of the second input image to generate an optimized style transfer image after iteratively optimizing is performed for N times, N≥1. In some embodiments, the iterative optimizer 520 includes a loss calculator 521 and an optimizer 522. Optionally, the loss calculator 521 is configured to calculate the content loss between the first input image and the initial style transfer image using the content loss function, and to calculate the style loss between the second input image and the initial style transfer image using the content loss function. Optionally, the initial style transfer image can be a white noise image. Optionally, the initial style transfer image can be the first input image. Optionally, the initial style transfer image can be the second input image.

In some embodiments, the initial style transfer image is inputted into the deep convolutional neural network 510. Optionally, the deep convolutional neural network 510 is configured to output a second content features and a second style features of the initial style transfer image. Optionally, the second content features of the initial style transfer image are outputted from the $7^{th}$ convolutional layer of the deep convolutional neural network 510, and the second style features of the initial style transfer image are outputted from the $1^{st}$, $3^{rd}$, $5^{th}$ convolutional layers of the deep convolutional neural network 510. Optionally, the content loss between the first content features of the first input image and the second content features of the initial style transfer image is calculated using the content loss function. Optionally, the style loss between the first style features of the second input image and the second style features of the initial style transfer image using the style loss function.

In some embodiments, iteratively optimizing the intermediate style transfer image includes generating content features and style features from an n-th intermediate style transfer image using a deep convolutional neural network, n≥1; calculating an n-th content loss of the n-th intermediate style transfer image relative to the original content features and an n-th style loss of the n-th intermediate style transfer image relative to the original style features based in the predefined loss function; calculating a weighted sum of the n-th content loss and the n-th style loss as an n-th total loss; and optimizing the n-th intermediate style transfer image to generate an (n+1)-th intermediate style transfer image based on the n-th total loss.

In one example, the n-th intermediate style transfer image is inputted into the deep convolutional neural network 510. The deep convolutional neural network 510 is configured to output a (n+1)-th content features and a (n+1)-th style features of the n-th intermediate style transfer image. The (n+1)-th content features of the n-th intermediate style transfer image are outputted from the $7^{th}$ convolutional layer of the deep convolutional neural network 510, and the (n+1)-th style features of the n-th intermediate style transfer image are outputted from the $1^{st}$, $3^{rd}$, $5^{th}$ convolutional layers of the deep convolutional neural network 510. The n-th content loss between the first content feature of the first input image and the (n+1)-th content features of the n-th intermediate style transfer image is calculated using the content loss function. The n-th style loss between the first style loss of the second input image and the (n+1)-th style loss the n-th intermediate style transfer image is calculated using the style loss function.

In some embodiments, in the deep convolutional neural network 510, calculating the content loss includes each of the convolutional layers outputting a respective feature map of an inputted image. Optionally, a convolutional layer includes $N_l$ convolutional kernels respectively outputting $N_l$ feature maps. Optionally, each of the $N_l$ feature maps has a same size. Optionally, $M_l$ is an area of each of the $N_l$ feature maps, e.g., $M_l$ equals a width of each of the $N_l$ feature maps times a height of each of the $N_l$ feature maps. Optionally, an output from the l-th convolutional layer can be stored in a matrix $F^l \in R^{N_l \times M_l}$, wherein $F_{ij}^l$ represents a value of a j-th pixel of a feature map outputted from an i-th convolutional kernel of the l-th convolutional layer.

Optionally, $\overline{p}$ represents the first input image (e.g. a photo), and $\overline{x}$ represents the intermediate style transfer image. $P^l$ is a feature map of the first input image outputted from the l-th convolutional layer of the deep convolutional neural network 510. $F^l$ is a feature map of the n-th intermediate style transfer image outputted from the l-th convolutional layer of the deep convolutional neural network 510. For example, the $P^i$ is a first content features image of the first input image. the $F^i$ is a (n+1)-th content features image of the n-th intermediate style transfer image. Optionally, $\overline{p}$ represents the first input image (e.g. a photo), and $\overline{x}$ represents the initial style transfer image. $P^i$ is a feature map of the first input image outputted from the l-th convolutional layer of the deep convolutional neural network 510. $F^i$ is a feature map of the initial style transfer image outputted from the l-th convolutional layer of the deep convolutional neural network 510. For example, the $P^l$ is a first content features image of the first input image. the $F^l$ is a second content features image of the initial style transfer image.

In some embodiments, the content loss function is defined as follows:

$$L_{content} = \frac{1}{2C1} \sum_{ij} (F_{ij}^l - P_{ij}^l)^2 \quad (5)$$

wherein C1 is a constant which is used to standardize the results, $F_{ij}^l$ stands for a value of a j-th pixel of a feature map of the n-th intermediate style transfer image outputted from an i-th convolutional kernel of the l-th convolutional layer of the deep convolutional neural network 510; $P_{ij}^l$ is a value of a j-th pixel of a feature map of the first input image outputted from the i-th convolutional kernel of the l-th convolutional layer of the deep convolutional neural network 510. Optionally, l is 7.

In some embodiments, content features are outputted from the $7^{th}$ convolutional layer of the deep convolutional neural network 510. Base on the content loss function (5), the content loss can be calculated using $$L_{content} = \frac{1}{2C1} \sum_{ij} (F_{ij}^7 - P_{ij}^7)^2,$$

wherein $F^7$ is the content feature map of the first input image outputted from the 7$^{th}$ convolutional layer of the deep convolutional neural network 510, and $P^7$ is the content feature map of the initial style transfer image or of the n-th intermediate style transfer image outputted from the 7$^{th}$ convolutional layer of the deep convolutional neural network 510.

In some embodiments, in the deep convolutional neural network 510, a Gram matrix is used to calculate the style loss. The Gram matrix is defined as follows:

$$G_{ij}^l = \Sigma_k F_{kj}^l F_{ik}^l \quad (6);$$

wherein k stands for a number of feature maps in the l-th convolutional layer of the deep convolutional neural network 510, i stands for row direction vectorization of each of the feature maps, and j stands column direction vectorization of each of the feature maps.

Optionally, $\bar{a}$ represents the second input image (e.g. a portrait painting), and $\bar{x}$ represents the intermediate style transfer image. $A^l$ is a Gram matrix of the second input image outputted from the l-th convolutional layer of the deep convolutional neural network 510. $G^l$ is a Gram matrix of the n-th intermediate style transfer image outputted from the l-th convolutional layer of the deep convolutional neural network 510. Optionally, $\bar{a}$ represents the second input image (e.g. a portrait painting), and $\bar{x}$ represents the initial style transfer image. $A^l$ is a Gram matrix of the second input image outputted from the l-th convolutional layer of the deep convolutional neural network 510. $G^l$ is a Gram matrix of the initial style transfer image outputted from the l-th convolutional layer of the deep convolutional neural network 510.

In some embodiment, the style loss of the l-th convolutional layer of the deep convolutional neural network 510 is defined as follows:

$$E_l = \frac{1}{4N_l^2 M_l^2 C2} \sum_{i,j} (G_{ij}^l - A_{ij}^l)^2 \quad (7)$$

wherein C2 is a constant which is used to standardize the results, $G_{ij}^l$ is a Gram matrix of the n-th intermediate style transfer image outputted from the l-th convolutional layer of the deep convolutional neural network 510, $A_{ij}^l$ stands for a Gram matrix of the second input image outputted from the l-th convolutional layer of the deep convolutional neural network 510, $N_l$ stands for a total number of the convolutional kernels in the l-th convolutional layer of the deep convolutional neural network 510 respectively a total number of outputting $N_l$ feature maps, and $M_l$ stands for an area of each of the $N_l$ feature maps.

In some embodiments, the total style loss can by calculated using the following function:

$$L_{style} = \sum_{l=0}^{L} w_l E_l \quad (8)$$

wherein $w_l$ is the weight of a style loss of the l-th convolutional layer of the deep convolutional neural network 510 with respect to the total style loss.

Optionally, subsequent to outputting style features from the 1$^{st}$, 3$^{rd}$, 5$^{th}$ convolutional layers of the deep convolutional neural network 510, based on the style loss function, the total style loss can be calculated using $L_{style} = w_1 E_1 + w_3 E_3 + w_5 E_5$ In some embodiments, the optimizer 522 is configured to optimize the intermediate style transfer image using the initial style transfer image as a starting point based on a predefined loss function, original content features of the first input image, and original style features of the second input image. Optionally, the optimizer 522 adopts an Adam gradient descent algorithm to optimize the intermediate style transfer image.

In some embodiments, the intermediate style transfer image is assigned as an iterative variable to be inputted in the deep convolutional neural network 510, and the respective content features and the style features of the intermediate style transfer image are used to calculate respective content loss and style loss.

In some embodiments, after iteratively optimizing is performed for N times, N>1, an optimized style transfer image is generated. Optionally, N can be determined experimentally. Optionally, an experience value can be assigned as N. In one example, N times is in a range of 90 times to 110 times, e.g., 90 times to 95 times, 95 times to 100 times, 100 times, to 105 times, 105 times to 110 times. For example, N times can be 100 times. In another example, the times of the iteratively optimizing process performed is limited in a relatively small number, the time spent to optimize an image is greatly reduced.

In some embodiments, the total loss is defined using the following function based on the content loss and the style loss.

$$L_{total} = \alpha L_{content} + \beta L_{style} \quad (9)$$

wherein $\alpha$ is a weight of content loss, and $\beta$ is a weight of style loss. Optionally, $\alpha$ and $\beta$ can be determined experimentally. Optionally, experience values can be assigned as $\alpha$ and $\beta$, respectively.

In some embodiments, the loss calculator 521 is configured to calculate a total loss based on the function (9). Optionally, the total loss can be used to determine whether an intermediate style transfer image reaches a style transfer effect. In some embodiments, the optimizer 522 is configured to output the optimized style transfer image when the total loss is under a threshold value.

In some embodiments, the deep convolutional neural network processing the first input image and the deep convolutional neural network processing the second input image are the same one. Optionally, the deep convolutional neural network processing the first input image and the deep convolutional neural network processing the second input image are two different deep convolutional neural networks.

Referring to FIG. 5, in some embodiments, a total number of convolutional layers of the deep convolutional network is 8, and only the first input image and the second input image are inputted into the deep convolutional network. The structure of the deep convolutional network is greatly simplified, the training volume is greatly reduced, and the speed of the deep convolutional network is further enhanced.

Figure 6:
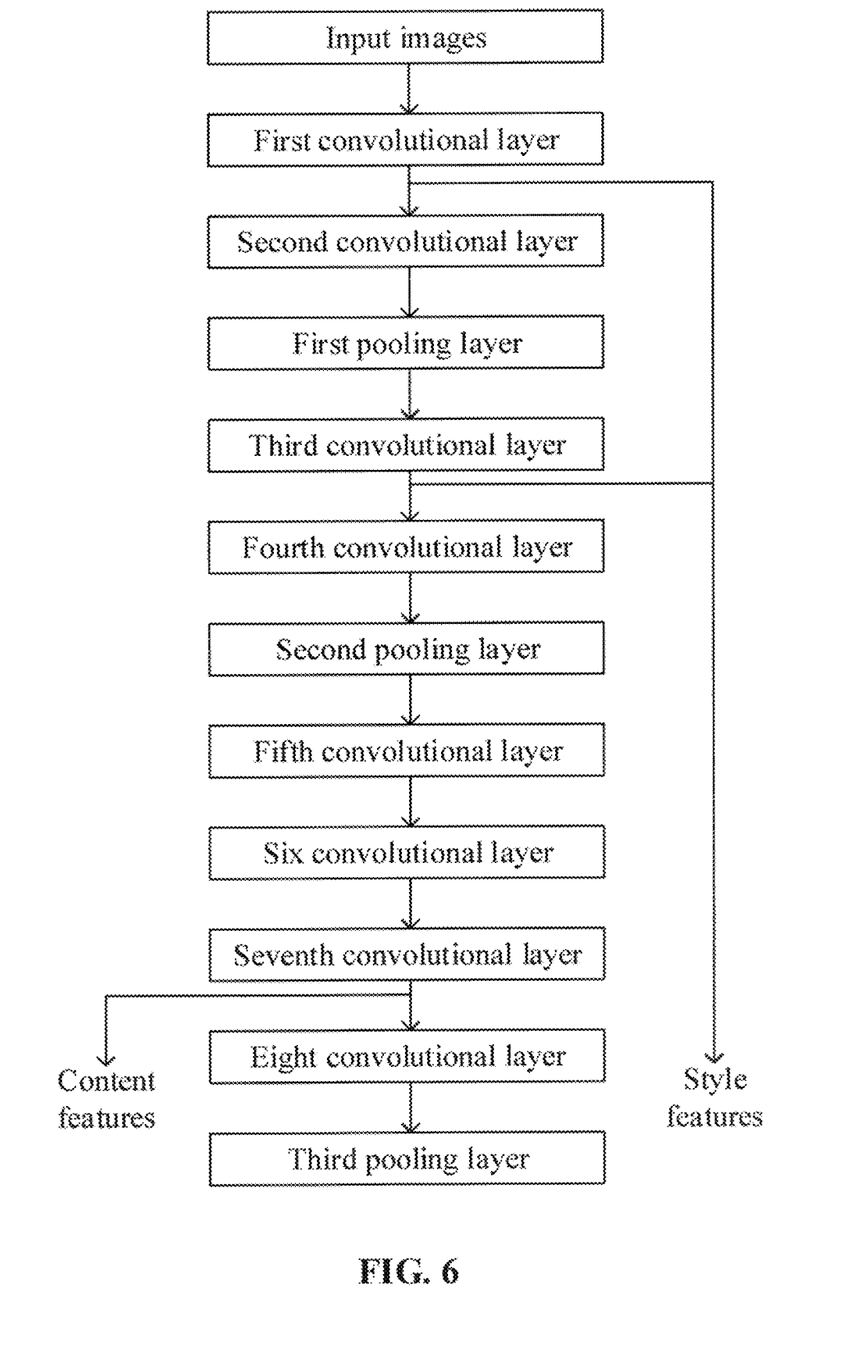
FIG. 6 is a schematic diagram illustrating a structure of a deep convolutional neural network in some embodiments according to the present disclosure.

FIG. 6 is a schematic diagram illustrating a structure of a deep convolutional neural network in some embodiments according to the present disclosure. Referring to FIG. 6, a deep convolutional network 600 includes 8 convolutional layers and 3 pooling layers. Optionally, an output from each convolutional layer is features extracted from an image inputted into the respective convolutional layer. Each pooling layer is configured to reduce the resolution of a feature map. Optionally, A feature map obtained after a respective image is inputted in a respective convolutional layer shows respective features corresponding to the respective convolutional layer. In one example, after inputted an image in a convolutional layer, a feature map obtained shows features of textures of the inputted image. In another example, after inputted an image in a convolutional layer, a feature map obtained shows features of edges of the inputted image. In another example, after inputted an image in a convolutional layer, a feature map obtained shows features of objects in the inputted image. Optionally, content features can be extracted from a convolutional layer difference from a convolutional layer where style features are extracted. Optionally, content features are generated from a higher convolutional layer of the deep convolutional neural network than that for the original style features.

In some embodiments, after an image is sequentially processed by a $1^{st}$ convolutional layer and a $2^{nd}$ convolutional layer, an image outputted from the $2^{nd}$ convolutional layer is inputted into a $1^{st}$ pooling layer. Subsequently, an image outputted from the $1^{st}$ pooling layer is sequentially processed by the $3^{rd}$ convolutional layer and the $4^{th}$ convolutional layer. Subsequently, an image outputted from the $4^{th}$ convolutional layer is inputted into a $2^{nd}$ pooling layer. Subsequently, an image outputted from the $2^{nd}$ pooling layer is sequentially processed by the $5^{th}$, $6^{th}$, $7^{th}$, and $8^{th}$ convolutional layers. Subsequently, an image outputted from the $8^{th}$ convolutional layer is inputted into a $3^{rd}$ pooling layer. Optionally, style features are obtained from the $1^{st}$, $3^{rd}$, and $5^{th}$ convolutional layers, and content features are obtained from the $7^{th}$ convolutional layer.

Figure 7:
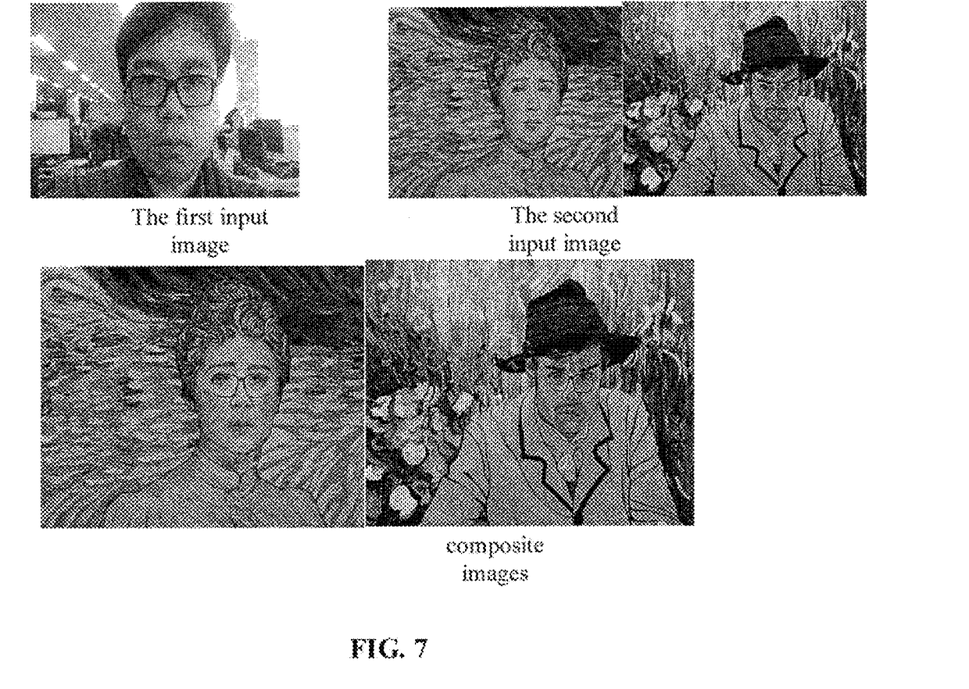
FIG. 7 is a schematic diagram showing a result of morphing facial images between a photo and a portrait painting in some embodiments according to the present disclosure.

FIG. 7 is a schematic diagram showing a result of morphing facial images between a photo and a portrait painting in some embodiments according to the present disclosure. Referring to FIG. 7, (a) is a photo of a user, (b) includes a first portrait painting (a left one) having a female portrait, and a second portrait painting (a right one) having a male portrait. (c) include a first composite image (a left one) after morphing the facial image of the photo of the user with the first portrait painting having a female portrait, and a second composite image (a right one) after morphing the facial image of the photo of the user with the second portrait painting having a male portrait. For example, both the first composite image and the second composite image have content features of the photo of the user. For example, both the first composite image and the second composite image have features including eyeglass, shapes of eyes, directions the eyes staring at, a shape of nose, and a shape of mouth of the user in the photo. Optionally, the style of the first portrait painting is well migrated to the user's facial part of the first composite image, and the style of the second portrait painting is well migrated to the user's facial part of the second composite image. For example, the color and the surround portion of the user facial part of the first composite image is blended with the style of the first portrait painting, and the color and the surround portion of the user facial part of the second composite image is blended with the style of the second portrait painting.

In some embodiments, by performing style transfer on a facial image of a photo, the facial part of the composite image can remain the same style as the portrait painting. The composite image may provide a more natural view to a viewer. Optionally, the style transfer is only performed on the facial image of the photo, the calculation volume of the deep convolutional neural network is greatly reduced, the time used to morph the facial image of the photo to a portrait painting is greatly reduced, and the user experience is further improved.

Figure 8:
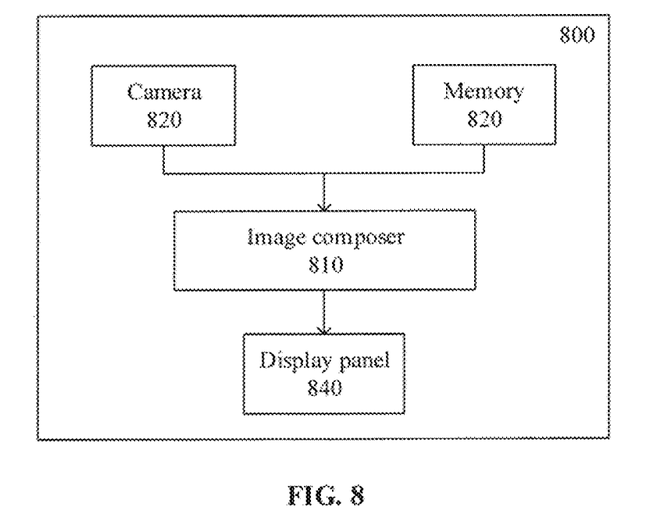
FIG. 8 is a schematic diagram showing a structure of an apparatus for generating a composite image in some embodiments according to the present disclosure.

In another aspect, the present disclosure also provides an apparatus generating a composite image. FIG. 8 is a schematic diagram showing a structure of an apparatus for generating a composite image in some embodiments according to the present disclosure. Referring to FIG. 8, various appropriate devices may be used as an apparatus for generating a composite image. Examples of devices suitable to be used as an apparatus include, but not limited to, desktop computing devices, mobile computing devices (e.g. smart phones, laptops, notebooks or tablets), network computers, home entertainment computers, interactive televisions, gaming systems.

In some embodiments, the apparatus 800 includes an image composer 810 configured to generate a composite image based on the first input image and the second input image.

In some embodiments, the apparatus 800 includes a camera 820 configured to obtain the first input image and the second input image. In some embodiments, the apparatus 800 includes a memory 830 configured to store the first input image and the second input image. Optionally, the image composer 810 can obtain the first input image and the second input image from the camera 820. Optionally, the image composer 810 can obtain the first input image and the second input image from the memory 830.

In some embodiments, the apparatus 800 includes a display panel 840. Optionally, a composite image generated by the image composer 810 can be transmitted to and displayed by the display panel 840.

In some embodiments, the image composer 810 can be an application configured to generating a composite image. Optionally, the apparatus 800 is configured to have the application having the function of generating a composite image.

In some embodiments, the apparatus 800 includes one or more processors. Optionally, the memory 830 and one or more processors are connected with each other. Optionally, the memory stores computer-executable instructions for controlling the one or more processors to iteratively optimize an intermediate style transfer image using an initial style transfer image as a starting point based on a predefined loss function, original content features of a first input image, and original style features of a second input image; generate an optimized style transfer image after iteratively optimizing is performed for N times, N>1; and morph the optimized style transfer image with the second input image to generate a composite image. Optionally, the memory stores computer-executable instructions for controlling the one or more processors to obtain the first input image and the second input image. Optionally, the memory stores computer-executable instructions for controlling the one or more processors to select the initial style transfer image. Optionally, the memory stores computer-executable instructions for controlling the one or more processors to select a white noise image as the initial style transfer image.

In some embodiments, the memory stores computer-executable instructions for controlling the one or more processors to extract content feature map from the first input image by a computer system; extract a style feature map from the second input image by the computer system; generate the original style features from the style feature map, e.g., using a deep convolutional neural network; and generate the original content features from the content feature map, e.g., using the deep convolutional neural network.

Optionally, the original content features is generated from a higher convolutional layer of the deep convolutional neural network than that for the original style features.

Optionally, the predefined loss function comprises a content loss function for calculating content loss and a style loss function for calculating style loss; and each of the content loss function and the style loss function is used in iteratively optimizing the intermediate style transfer image.

In some embodiments, the memory stores computer-executable instructions for controlling the one or more processors to calculate a weighted sum of a content loss and a style loss as a total loss; and generate the optimized style transfer image when the total loss is lower than a threshold value.

In some embodiments, the memory stores computer-executable instructions for controlling the one or more processors to generate content features and style features from an n-th intermediate style transfer image using a deep convolutional neural network, n≥1; calculate an n-th content loss of the n-th intermediate style transfer image relative to the original content features and an n-th style loss of the n-th intermediate style transfer image relative to the original style features based in the predefined loss function; calculate a weighted sum of the n-th content loss and the n-th style loss as an n-th total loss; and optimize the n-th intermediate style transfer image to generate an (n+1) intermediate style transfer image based on the n-th total loss, thereby iteratively optimizing the intermediate style transfer image.

Optionally, the content loss function is defined as $$L_{content} = \frac{1}{2C1} \sum_{ij} (F_{ij}^l - P_{ij}^l)^2;$$

wherein C1 is a standardizing constant, $F_{ij}^l$ stands for a value of a j-th pixel of a feature map of an n-th intermediate style migration image outputted from an i-th convolutional kernel of a l-th convolutional layer of a deep convolutional neural network; $P_{ij}^l$ is a value of a j-th pixel of a feature map of the first input image outputted from the i-th convolutional kernel of the l-th convolutional layer of the deep convolutional neural network.

Optionally, the style loss function is defined as $$L_{style} = \sum_{l=0}^{L} w_l E_l; \text{ wherein } E_l = \frac{1}{4N_l^2 M_l^2 C2} \sum_{i,j} (G_{ij}^l - A_{ij}^l)^2;$$

wherein C2 is a standardizing constant, $G_{ij}^l$ is a Gram matrix of the n-th intermediate style migration image outputted from the l-th convolutional layer of the deep convolutional neural network, $A_{ij}^l$ stands for a Gram matrix of the second input image outputted from the l-th convolutional layer of the deep convolutional neural network, $N_l$ stands for a total number of the convolutional kernels in the l-th convolutional layer of the deep convolutional neural network outputting $N_l$ feature maps, and $M_l$ stands for an average area of each of the $N_l$ feature maps, and $w_l$ stands for a weight of a style loss of the l-th convolutional layer of the deep convolutional neural network with respect to a total style loss.

In some embodiments, prior to morphing the optimized style transfer image with the second input image, the memory stores computer-executable instructions for controlling the one or more processors to perform an image alignment between the optimized style transfer image and the second input image.

In some embodiments, the memory stores computer-executable instructions for controlling the one or more processors to morph a target region in a calibrated optimized style transfer image with a corresponding region in the second input image using a morphed mask as a guide, thereby morphing the optimized style migration image with the second input image. Optionally, the memory stores computer-executable instructions for controlling the one or more processors to calculate a first two-dimensional convex hull boundary based on feature point vector of the optimized style transfer image; calculate a second two-dimensional convex hull boundary based on feature point vector of the second input image; assign a region in the first two-dimensional convex hull boundary as a first mask; assign a region in the second two-dimensional convex hull boundary as a second mask; and assign a union of the first mask and the second mask as the morphed mask. Optionally, the memory stores computer-executable instructions for controlling the one or more processors to perform Gaussian blur on the optimized style transfer image to obtain a blurred optimized style transfer image; perform Gaussian blur on the second input image to obtain a blurred second input image; calculate a luminance scale coefficient for each pixel by calculating a ratio of luminance values between the blurred optimized style transfer image and the blurred second input image; and perform a luminance value calibration on the optimized style transfer image based on the luminance scale coefficient to obtain the calibrated optimized style transfer image.

Optionally, a total number of convolutional layers of the deep convolutional neural network is 8.

Optionally, the original content features are generated from a seventh convolutional layer of the deep convolutional neural network; and the original style features is generated from a first convolutional layer, a third convolutional layer, and a fifth convolutional layer of the deep convolutional neural network.

Optionally, the deep convolutional neural network uses pre-training parameters of a VGG19 model as initial pre-training parameters.

Optionally, the first input image includes a first facial image; the second input image comprises a second facial image; the original content features of the first input image comprise original facial content features of the first facial image; the original style features of the second input image comprise original facial style features of the second facial image; the optimized style transfer image comprises an optimized facial style transfer image; and morphing the optimized style transfer image with the second input image includes morphing the optimized facial style transfer image with the second facial image.

In another aspect, the present disclosure also provides a computer-program product including a non-transitory tangible computer-readable medium having computer-readable instructions thereon. In some embodiments, the computer-readable instructions are executable by a processor to cause the processor to iteratively optimize an intermediate style transfer image using an initial style transfer image as a starting point based on a predefined loss function, original content features of a first input image, and original style features of a second input image; generate an optimized style transfer image after iteratively optimizing is performed for N times, N>1; and morph the optimized style transfer image with the second input image to generate the composite image. Optionally, the computer-readable instructions are executable by a processor to cause the processor to obtain a first input image and a second input image. Optionally, the computer-readable instructions are executable by a processor to cause the processor to select an initial style transfer image.

In some embodiments, the computer-readable instructions being executable by a processor to cause the processor to extract content feature map from the first input image by a computer system; extract a style feature map from the second input image by the computer system; generate the original style features from the style feature map, e.g., using a deep convolutional neural network; and generate the original content features from the content feature map, e.g., using the deep convolutional neural network.

Optionally, the original content features is generated from a higher convolutional layer of the deep convolutional neural network than that for the original style features.

Optionally, the predefined loss function comprises a content loss function for calculating content loss and a style loss function for calculating style loss; and each of the content loss function and the style loss function is used in iteratively optimizing the intermediate style transfer image.

In some embodiments, the computer-readable instructions being executable by a processor to cause the processor to calculate a weighted sum of a content loss and a style loss as a total loss; and generate the optimized style transfer image when the total loss is lower than a threshold value.

In some embodiments, the computer-readable instructions being executable by a processor to cause the processor to perform generating content features and style features from an n-th intermediate style transfer image using a deep convolutional neural network, n≥1; calculating an n-th content loss of the n-th intermediate style transfer image relative to the original content features and an n-th style loss of the n-th intermediate style transfer image relative to the original style features based in the predefined loss function; calculating a weighted sum of the n-th content loss and the n-th style loss as an n-th total loss; and optimizing the n-th intermediate style transfer image to generate an (n+1) intermediate style transfer image based on the n-th total loss, thereby iteratively optimizing the intermediate style transfer image.

Optionally, the content loss function is defined as $$L_{content} = \frac{1}{2C1} \sum_{ij} (F_{ij}^l - P_{ij}^l)^2;$$

wherein C1 is a standardizing constant, $F_{ij}^l$ stands for a value of a j-th pixel of a feature map of an n-th intermediate style migration image outputted from an i-th convolutional kernel of a l-th convolutional layer of a deep convolutional neural network; $P_{ij}^l$ is a value of a j-th pixel of a feature map of the first input image outputted from the i-th convolutional kernel of the l-th convolutional layer of the deep convolutional neural network.

Optionally, the style loss function is defined as $$L_{style} = \sum_{l=0}^{L} w_l E_l; \text{ wherein } E_l = \frac{1}{4N_l^2 M_l^2 C2} \sum_{i,j} (G_{ij}^l - A_{ij}^l)^2;$$

wherein C2 is a standardizing constant, $G_{ij}^l$ is a Gram matrix of the n-th intermediate style migration image outputted from the l-th convolutional layer of the deep convolutional neural network, $A_{ij}^l$ stands for a Gram matrix of the second input image outputted from the l-th convolutional layer of the deep convolutional neural network, $N_l$ stands for a total number of the convolutional kernels in the l-th convolutional layer of the deep convolutional neural network outputting $N_l$ feature maps, and $M_l$ stands for an average area of each of the $N_l$ feature maps, and $w_l$ stands for a weight of a style loss of the l-th convolutional layer of the deep convolutional neural network with respect to a total style loss.

In some embodiments, prior to morphing the optimized style transfer image with the second input image, the computer-readable instructions being executable by a processor to cause the processor to perform an image alignment between the optimized style transfer image and the second input image.

In some embodiments, the computer-readable instructions are executable by a processor to cause the processor to perform morphing a target region in the calibrated optimized style transfer image with a corresponding region in the second input image using the morphed mask as a guide, thereby morphing the optimized style transfer image with the second input image. Optionally, the computer-readable instructions are executable by a processor to cause the processor to perform calculating a first two-dimensional convex hull boundary based on feature point vector of the optimized style transfer image; calculating a second two-dimensional convex hull boundary based on feature point vector of the second input image; assigning a region in the first two-dimensional convex hull boundary as a first mask; assigning a region in the second two-dimensional convex hull boundary as a second mask; and assigning a union of the first mask and the second mask as the morphed mask. Optionally, the computer-readable instructions are executable by a processor to cause the processor to perform Gaussian blur on the optimized style transfer image to obtain a blurred optimized style transfer image; perform Gaussian blur on the second input image to obtain a blurred second input image; perform a luminance scale coefficient for each pixel by calculating a ratio of luminance values between the blurred optimized style transfer image and the blurred second input image; and perform a luminance value calibration on the optimized style transfer image based on the luminance scale coefficient to obtain the calibrated optimized style transfer image.

Optionally, a total number of convolutional layers of the deep convolutional neural network is 8.

Optionally, the original content features are generated from a seventh convolutional layer of the deep convolutional neural network; and the original style features is generated from a first convolutional layer, a third convolutional layer, and a fifth convolutional layer of the deep convolutional neural network.

Optionally, the deep convolutional neural network uses pre-training parameters of a VGG19 model as initial pre-training parameters.

Optionally, the first input image includes a first facial image; the second input image comprises a second facial image; the original content features of the first input image comprise original facial content features of the first facial image; the original style features of the second input image comprise original facial style features of the second facial image; the optimized style transfer image comprises an optimized facial style transfer image; and morphing the optimized style transfer image with the second input image includes morphing the optimized facial style transfer image with the second facial image.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A computer-implemented method for generating a composite image, comprising:
    iteratively optimizing an intermediate style transfer image using an initial style transfer image as a starting point based on a predefined loss function, original content features of a first input image, and original style features of a second input image;
    generating an optimized style transfer image after iteratively optimizing is performed for N times, N>1; and
    morphing the optimized style transfer image with the second input image to generate the composite image.

2. The computer-implemented method of claim 1, further comprising:
    extracting a content feature map from the first input image by a computer system;
    extracting a style feature map from the second input image by the computer system;
    generating the original style features from the style feature map; and
    generating the original content features from the content feature map.

3. The computer-implemented method of claim 2, wherein the original style features are generated from the style feature map using a deep convolutional neural network; and
    the original content features are generated from the content feature map using the deep convolutional neural network.

4. The computer-implemented method of claim 3, wherein the original content features are generated from a higher convolutional layer of the deep convolutional neural network than that for the original style features.

5. The computer-implemented method of claim 3, wherein a total number of convolutional layers of the deep convolutional neural network is 8.

6. The computer-implemented method of claim 5, wherein the original content features is generated from a seventh convolutional layer of the deep convolutional neural network; and
    the original style features is generated from a first convolutional layer, a third convolutional layer, and a fifth convolutional layer of the deep convolutional neural network.

7. The computer-implemented method of claim 3, wherein the deep convolutional neural network uses pre-training parameters of a VGG19 model as initial pre-training parameters.

8. The computer-implemented method of claim 1, wherein the predefined loss function comprises a content loss function for calculating content loss and a style loss function for calculating style loss; and
    each of the content loss function and the style loss function is used in iteratively optimizing the intermediate style transfer image.

9. The computer-implemented method of claim 8, further comprising:
    calculating a weighted sum of a content loss and a style loss as a total loss; and
    generating the optimized style transfer image when the total loss is lower than a threshold value.

10. The computer-implemented method of claim 8, wherein iteratively optimizing the intermediate style transfer image comprises:
    generating content features and style features from an n-th intermediate style transfer image using a deep convolutional neural network, N−1≥n≥1;
    calculating an n-th content loss of the n-th intermediate style transfer image relative to the original content features and an n-th style loss of the n-th intermediate style transfer image relative to the original style features based on the predefined loss function;
    calculating a weighted sum of the n-th content loss and the n-th style loss as an n-th total loss; and
    optimizing the n-th intermediate style transfer image to generate an (n+1) intermediate style transfer image based on the n-th total loss.

11. The computer-implemented method of claim 8, wherein the content loss function is defined as $$L_{content} = \frac{1}{2C1}\sum_{ij}(F_{ij}^l - P_{ij}^l)^2;$$

and
    wherein C1 is a standardizing constant, $F_{ij}^l$ stands for a value of a j-th pixel of a feature map of an n-th intermediate style transfer image outputted from an i-th convolutional kernel of a l-th convolutional layer of a deep convolutional neural network; $P_{ij}^l$ is a value of a j-th pixel of a feature map of the first input image outputted from the l-th convolutional kernel of the l-th convolutional layer of the deep convolutional neural network.

12. The computer-implemented method of claim 8, wherein the style loss function is defined as $$L_{style} = \sum_{l=0}^{L} w_l E_l;$$

$$\text{wherein } E_l = \frac{1}{4N_l^2 M_l^2 C2} \sum_{i,j} (G_{ij}^l - A_{ij}^l)^2; \text{ and}$$

wherein C2 is a standardizing constant, $G_{ij}^l$ is a Gram matrix of an n-th intermediate style transfer image outputted from a l-th convolutional layer of a deep convolutional neural network, $A_{ij}^l$ stands for a Gram matrix of the second input image outputted from the l-th convolutional layer of the deep convolutional neural network, $N_l$ stands for a total number of convolutional kernels in the l-th convolutional layer of the deep convolutional neural network respectively outputting a total number of $N_l$ feature maps, and $M_l$ stands for an area of each of the $N_l$ feature maps, and $w_l$ stands for a weight of a style loss of the l-th convolutional layer of the deep convolutional neural network with respect to a total style loss.

13. The computer-implemented method of claim 1, prior to morphing the optimized style transfer image with the second input image, further comprising performing an image alignment between the optimized style transfer image and the second input image.

14. The computer-implemented method of claim 1, wherein morphing the optimized style transfer image with the second input image comprises morphing a target region in a calibrated optimized style transfer image with a corresponding region in the second input image using a morphed mask as a guide.

15. The computer-implemented method of claim 14, further comprising:
performing Gaussian blur on the optimized style transfer image to obtain a blurred optimized style transfer image;
performing Gaussian blur on the second input image to obtain a blurred second input image;
calculating a luminance scale coefficient for each pixel by calculating a ratio of luminance values between the blurred optimized style transfer image and the blurred second input image for each pixel; and
performing a luminance value calibration on the optimized style transfer image based on the luminance scale coefficient of each pixel to obtain the calibrated optimized style transfer image.

16. The computer-implemented method of claim 14, further comprising:
calculating a first two-dimensional convex hull boundary based on feature point vector of the optimized style transfer image;
calculating a second two-dimensional convex hull boundary based on feature point vector of the second input image;
assigning a region in the first two-dimensional convex hull boundary as a first mask;
assigning a region in the second two-dimensional convex hull boundary as a second mask; and
assigning a union of the first mask and the second mask as the morphed mask.

17. The computer-implemented method of claim 1, wherein the first input image comprises a first facial image; the second input image comprises a second facial image;
the original content features of the first input image comprise original facial content features of the first facial image;
the original style features of the second input image comprise original facial style features of the second facial image;
the optimized style transfer image comprises an optimized facial style transfer image; and
morphing the optimized style transfer image with the second input image comprises morphing the optimized facial style transfer image with the second facial image.

18. The computer-implemented method of claim 1, wherein a white noise image is selected as the initial style transfer image.

19. An apparatus for generating a composite image, comprising:
a memory;
one or more processors;
wherein the memory and the one or more processors are connected with each other; and
the memory stores computer-executable instructions for controlling the one or more processors to:
iteratively optimize an intermediate style transfer image using an initial style transfer image as a starting point based on a predefined loss function, original content features of a first input image, and original style features of a second input image;
generate an optimized style transfer image after iteratively optimizing is performed for N times, N>1; and
morph the optimized style transfer image with the second input image to generate the composite image.

20. A computer-program product comprising a non-transitory tangible computer-readable medium having computer-readable instructions thereon, the computer-readable instructions being executable by a processor to cause the processor to perform:
iteratively optimizing an intermediate style transfer image using an initial style transfer image as a starting point based on a predefined loss function, original content features of a first input image, and original style features of a second input image;
generating an optimized style transfer image after iteratively optimizing is performed for N times, N>1; and
morphing the optimized style transfer image with the second input image to generate a composite image.

* * * * *